US009268489B2

(12) United States Patent
Aizman et al.

(10) Patent No.: US 9,268,489 B2
(45) Date of Patent: *Feb. 23, 2016

(54) METHOD AND SYSTEM FOR HETEROGENEOUS DATA VOLUME

(71) Applicant: Nexenta Systems, Inc., Mountain View, CA (US)

(72) Inventors: Alexander Aizman, Mountain View, CA (US); Vineeth Remanan Pillai, Mountain View, CA (US)

(73) Assignee: Nexenta Systems, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/665,298

(22) Filed: Mar. 23, 2015

(65) Prior Publication Data

US 2015/0193164 A1 Jul. 9, 2015

Related U.S. Application Data

(63) Continuation of application No. 14/281,234, filed on May 19, 2014, now Pat. No. 8,990,496, which is a continuation of application No. 13/239,258, filed on Sep. 21, 2011, now Pat. No. 8,954,669, which is a (Continued)

(51) Int. Cl.
*G06F 3/06* (2006.01)
*G06F 11/10* (2006.01)
(Continued)

(52) U.S. Cl.
CPC .............. *G06F 3/0619* (2013.01); *G06F 3/061* (2013.01); *G06F 3/064* (2013.01); *G06F 3/065* (2013.01); *G06F 3/0665* (2013.01); *G06F 3/0685* (2013.01); *G06F 3/0689* (2013.01);

*G06F 7/00* (2013.01); *G06F 11/1076* (2013.01); *G06F 11/3048* (2013.01); *G06F 2003/0692* (2013.01);
(Continued)

(58) Field of Classification Search
CPC ..... G06F 3/0619; G06F 3/0665; G06F 3/065; G06F 3/0685; G06F 3/0689; G06F 3/064; G06F 3/061; G06F 7/00; G06F 11/1076; G06F 2003/0692; G06F 2211/1028; G06F 2211/103
See application file for complete search history.

(56) References Cited

U.S. PATENT DOCUMENTS 5,430,855 A 7/1995 Walsh et al.
5,696,934 A 12/1997 Jacobson et al.
(Continued)

OTHER PUBLICATIONS

Garrison et al "Umbrella File System: Storage Management Across Heterogeneous Devices" ACM Trans. Stor. 5, 1, Article 3 (Mar. 2009).

(Continued)

*Primary Examiner* — Matthew Bradley
*Assistant Examiner* — Rocio Del Mar Perez-Velez
(74) *Attorney, Agent, or Firm* — Ropes & Gray LLP

(57) ABSTRACT

A method and system is disclosed for providing a heterogeneous data storage comprising a plurality of storage devices of different types with respect to device vendor, model, capacity, performance and/or function. The present invention employs data access mechanisms specific to the type of underlying storage and the type of data to be stored or retrieved, and provides for integrated remote mirroring, disaster recovery and hierarchical storage management (HSM), as well as improved I/O performance and life expectancy of storage disks. A method of writing to and reading from heterogeneous data volume is also disclosed.

10 Claims, 10 Drawing Sheets

Related U.S. Application Data continuation-in-part of application No. 12/875,073, filed on Sep. 2, 2010, now Pat. No. 8,984,241.

(60) Provisional application No. 61/365,153, filed on Jul. 16, 2010, provisional application No. 61/362,260, filed on Jul. 7, 2010.

(51) Int. Cl.
*G06F 7/00* (2006.01)
*G06F 11/30* (2006.01)

(52) U.S. Cl.
CPC ... *G06F 2211/103* (2013.01); *G06F 2211/1028* (2013.01)

(56) References Cited

U.S. PATENT DOCUMENTS

| | | | |
|---|---|---|---|
| 6,223,206 B1 | 4/2001 | Dan et al. |
| 6,311,251 B1 | 10/2001 | Merritt et al. |
| 6,330,621 B1 | 12/2001 | Bakke et al. |
| 6,487,636 B1 | 11/2002 | Dolphin et al. |
| 6,832,289 B2 | 12/2004 | Johnson |
| 7,054,927 B2 | 5/2006 | Ulrich et al. |
| 7,113,984 B1 | 9/2006 | Wallace et al. |
| 7,149,846 B2 | 12/2006 | Hetrick |
| 7,293,133 B1 | 11/2007 | Colgrove et al. |
| 7,340,490 B2 | 3/2008 | Teloh et al. |
| 7,454,446 B2 | 11/2008 | Leung et al. |
| 7,464,222 B2 | 12/2008 | Matsunami et al. |
| 7,478,221 B1 | 1/2009 | Karr et al. |
| 7,594,024 B2 | 9/2009 | Shah et al. |
| 7,617,259 B1 | 11/2009 | Muth et al. |
| 7,725,444 B2 | 5/2010 | Devarakonda et al. |
| 2001/0018728 A1 | 8/2001 | Topham et al. |
| 2002/0138559 A1 | 9/2002 | Ulrich et al. |
| 2002/0174315 A1* | 11/2002 | Yamamoto ............ G06F 3/0613 711/170 |
| 2004/0153606 A1 | 8/2004 | Schott |
| 2005/0015461 A1 | 1/2005 | Richard et al. |
| 2005/0216481 A1 | 9/2005 | Crowther et al. |
| 2007/0022087 A1 | 1/2007 | Bahar et al. |
| 2007/0033430 A1 | 2/2007 | Itkis et al. |
| 2007/0288494 A1 | 12/2007 | Chrin et al. |
| 2008/0034076 A1 | 2/2008 | Ishikawa et al. |
| 2009/0094320 A1 | 4/2009 | Palthepu et al. |
| 2009/0204758 A1 | 8/2009 | Luning |
| 2009/0210431 A1 | 8/2009 | Marinkovic et al. |
| 2009/0327603 A1 | 12/2009 | McKean et al. |
| 2010/0070732 A1 | 3/2010 | Strutt |
| 2010/0106683 A1 | 4/2010 | Nomoto et al. |
| 2010/0149684 A1 | 6/2010 | Kojima et al. |
| 2010/0281230 A1 | 11/2010 | Rabii et al. |
| 2011/0040935 A1 | 2/2011 | Murayama et al. |
| 2011/0246716 A1 | 10/2011 | Frame et al. |

OTHER PUBLICATIONS

Extended European Search Report in EP Application No. EP14176942 dated Aug. 29, 2014.

Hsu, W. W., et al., "The Automatic Improvement of Locality in Storage Systems, ACM Transaction on Computer Systems", vol. 23, No. 4, pp. 424-473 (Nov. 2005).

Riedel, Erik, "Storage Systems No Just a Bunch of Disks Anymore," Queue, pp. 33-41 (Jun. 2003).

* cited by examiner

METHOD AND SYSTEM FOR HETEROGENEOUS DATA VOLUME

CROSS-REFERENCE TO RELATED APPLICATION

This application is a continuation of U.S. patent application Ser. No. 14/281,234, filed May 19, 2014 (allowed), which is a continuation of U.S. patent application Ser. No. 13/239,258, filed on Sep. 21, 2011 know U.S. Pat. No. 8,954, 669), which is a Continuation-in-Part of U.S. patent application Ser. No. 12/875,073, filed on Sep. 2, 2010 (now U.S. Pat. No. 8,984,241), which claims priority to and the benefit under 35 U.S.C. 119(e) of U.S. Provisional Application No. 61/365, 153, filed on Jul. 16, 2010 and U.S. Provisional Application No. 61/362,260, filed on Jul. 7, 2010, all of the above being incorporated herein by reference in their respective entireties.

FIELD OF THE INVENTION

The present invention relates to heterogeneous storage systems, methods and architectures, and specifically to providing fault tolerant data storage with improved I/O performance and integrated support for remote mirroring and hierarchical storage management applications.

BACKGROUND OF THE INVENTION

Typical data volumes consist of one or more storage disks with similar characteristics configured in a specific replication scheme to provide increased capacity, I/O performance and high availability of the data. Conventional replication schemes are commonly implemented as Redundant Arrays of Inexpensive Disks (RAID); a variety of RAID configurations (or schemes) exist to suit different storage needs. For instance, RAID-1 scheme maintains an exact copy (or mirror) of data blocks on two or more disks. An N-way mirror is said to include N disks (where N>1) that maintain N identical copies of data, one copy per disk.

Data volumes typically comprise one or more RAID groups of disks and, optionally, spare disks that can be hot-plugged to the volume in case of a failure of a data disk.

FIG. 1 illustrates a typical data volume 100 with a single RAID-5 group 101 comprising four storage disks. The data volume 100 also includes three spare disks 102. In general, the RAID-5 replication scheme works as follows. Each logical block submitted by an application for writing is first segmented into data blocks. Assuming the RAID-5 group 101 includes four data disks, for each set of three data blocks an additional parity block would have to be generated. The three data blocks and the parity block in combination are said to be a stripe. Logical blocks are then written to the data volume 100 in stripes, wherein each stripe spans the entire four disks and includes three data blocks and one parity block. The RAID-5 scheme improves the overall I/O performance and provides for data recovery should any one of the data disks fail. In the event of, for instance, a latent sector error, a corresponding corrupted data block may be reconstructed from the remaining data blocks and a parity block. RAID-5 will survive a total loss of a single drive as well.

In general, replication schemes used in the existing data volumes are subject to the following issues:

First and foremost, even with substantial redundancy configured in, the conventional replication schemes present no protection against simultaneous failure of multiple drives within the RAID or a RAID controller itself. For instance, the RAID-5 shown on the FIG. 1 will not be able to withstand simultaneous failure of any two of its four disks. This simple example demonstrates the need to maintain remote copies using external to RAID mechanisms, such as third party backup and disaster recovery software.

Redundancy itself has a price. The price is associated with reduced effective capacity of the data volume. For instance, the capacity of a RAID-1 including same-size N disks (N>=2) would be equal to the capacity of a single disk. Hence, there is a tradeoff that needs to be made between data protection (via multiple copies of data) and effective storage capacity.

Yet another type of the tradeoff that storage administrators and IT departments needs to often consider is the tradeoff between storage capacity and I/O performance. In particular, rapid advances in performance, reliability, and storage capacities for solid state drives (SSD) make it feasible to be used within the data volumes. In comparison to rotating hard disk drives (HDDs), SSDs offer better random I/O performance, silent operation and better power consumption due to absence of any moving parts. SSDs however have a number of limitations, including dependency on strict 4K or 8K I/O alignment, certain requirements on I/O block size required for optimal performance, degrading performance due to wearing of storage cells, lower capacity compared to HDDs and higher price. All of the above renders SSDs suitable for storage of certain types of data—in particular, data that requires superior I/O performance (better IOPS).

Similarly, available HDDs differ substantially in performance, depending on the vendor, model, capacity and other characteristics. Using disks of different types in a conventional data volume will yield sub-optimal performance.

For instance, let's consider a read workload in a data volume containing two disks configured in RAID-1 (mirror) scheme—one disk operating at 100 MB/second and another at 200 MB/second for read operations. Traditional data volumes will spread the I/O workload evenly among all the disks in the volume. The combined read throughput in this example, assuming a conventional round-robin scheme employed in the data volume, will average to up to 133 MB/second. This is of course better than 100 MB/second of the slower disk but certainly much worse than the 200 MB/second expected of the faster disk.

An attempt to utilize both SSDs and HDDs in a conventional volume will also produce sub-optimal results. Due to the seek latency and rotational delay, existing data access mechanisms utilize I/O request queuing and reordering specifically fine-tuned for rotating disks. The corresponding I/O processing logic is unnecessary for SSDs because of the fact that SSDs have no rotational delay or seek latency.

Further, an attempt to utilize disks with different characteristics within a conventional data volume may adversely affect not only I/O performance of a conventional data volume but its reliability as well. For instance, SSDs have limited lifetimes, in terms of maximum number of program-erase (P/E) cycles. The life span of SSDs can be increased if data access mechanisms that write to SSDs compress the data before writing. This and similar differentiation targeting heterogeneous storage media is simply not present and not designed-in, as far as conventional data volumes are concerned.

To summarize, existing data volumes provide the benefits of transparent access to multiple disks and replication schemes for applications, such as filesystems, databases, search engines, cloud storage systems. The associated tradeoffs and limitations include the tradeoff between effective capacity and levels of replication (redundancy), and the tradeoff between capacity and I/O performance. This is exactly why optimizing applications that access different types of data for overall performance and reliability often comes with additional complexity of accessing multiple data volumes—a volume per type of data. For example, a database I/O performance will improve if its indexes are stored on SSDs. It may appear to be not feasible, however, to store database tables (as opposed to indexes) on the SSDs as well—the latter may require multiple terabytes or even petabytes of capacity. Hence, this tradeoff between capacity and I/O performance currently cannot be resolved within a scope of a single data volume.

Similarly, existing local filesystem contain files and directories that, from a user perspective, often require different access latencies, priorities of I/O processing, capacities, replication levels—or a combination of all of the above. Existing local filesystems do not, however, span multiple data volumes. Therefore, the requirement to handle files and directories of a given filesystems differently (for instance on a per-file type or a wildcard match basis) is currently impossible to address.

The present invention addresses these drawbacks and limitations of the traditional data volumes, by accommodating heterogeneous storage disks in a volume and making use of the storage characteristics of the disks to intelligently route data to/from the volume's disks. The present invention provides for improved I/O performance and reliability of the data volume, optimal usage of its capacity, and the capability to manage data differently and optimally, on a per-type-of-data basis.

SUMMARY OF THE INVENTION

A system and method in accordance with the present invention provides for a heterogeneous data volume with plurality of storage disks of different types with respect to disk vendor, model, capacity, I/O latency or I/O throughput. The associated new capabilities include better I/O performance, improved life expectancy for storage disks, integrated support for Hierarchical Storage Management (HSM) and disaster recovery (DR) applications.

A method and system in accordance with the present invention provides applications (such as filesystems, databases, search engines, cloud storage systems) with the capability to classify and manage data on a per-type-of-data basis. For instance, data that requires the best I/O performance can be directed to use (that is, be stored on and retrieved from) SSDs, while second and third copies of the data and/or archival data can be directed to remote storage. One of ordinary skill in the art will appreciate that the present invention provides for these and similar capabilities without requiring or imposing changes on its applications.

In addition, embodiments of the present invention provide for integrated HSM by (1) accommodating disks of different classes of storage in a single data volume, and (2) performing within-the-volume data migration, based on policies set by the system administrator or SMS.

In a first aspect, the invention relates to a system. The system includes a processor, a heterogeneous data volume comprising a plurality of redundancy groups and storage disks and an electronic storage medium containing program instructions executable on the processor for writing data to and reading data from the heterogeneous data volume. Storage disks of the heterogeneous data volume and redundancy groups that contain those storage disks are associated with classes of storage that reflect either administrative settings or characteristics and capabilities of the underlying storage media.

In a second aspect, a method of writing data to a heterogeneous data volume is disclosed. The method comprises identifying redundancy groups with classes of storage that match class of storage associated with data that is being written. The method further comprises identifying storage disks within the selected redundancy groups to write the data.

In a third aspect, a method for reading from the heterogeneous data volume is disclosed. The method includes identifying redundancy groups and storage disks within those redundancy groups. The storage disks include classes of storage that match a class of storage of data that is being read, selecting a subset of redundancy groups and storage disks within those redundancy groups based on the associated read preference values, determining a replication scheme of the selected redundancy group and the data reading mechanism associated with the class of storage of the storage disks in the selected redundancy group, reading the data using this data reading mechanism.

Other aspects of the invention will be apparent from the following detailed description and the appended claims.

BRIEF DESCRIPTION OF THE DRAWINGS

The invention itself, further objects, use cases and advantages thereof, will be best understood by reference to the following detailed description of an illustrative embodiment when read in conjunction with the drawings, wherein.

DETAILED DESCRIPTION OF THE INVENTION

The present invention relates to heterogeneous storage systems comprising a plurality of storage disks of different types. The invention provides for fault tolerant data storage with improved I/O performance and integrated support for remote mirroring and hierarchical storage management applications.

The following description is presented to enable one of ordinary skill in the art to make and use the invention. Various modifications to the embodiments and the generic principles and features described herein will be readily apparent to one of ordinary skill in the art. The phrase "in one embodiment" in this specification does not necessarily refer to the same embodiment. Thus, the present invention is not intended to be limited to the embodiments shown, but is to be accorded the widest scope consistent with the principles and features described herein.

A heterogeneous data volume comprises a plurality of storage disks assembled in one or more redundancy groups. Each redundancy group supports a certain RAID scheme, for instance: RAID-0, RAID-1, RAID-5, RAID-6, RAID-1+0. Each redundancy group is comprised of disks and/or other redundancy groups.

One of ordinary skill in the art will notice that a plain striped array of disks (that is, RAID-0) is also considered a redundancy group in the context of this invention.

A homogeneous redundancy group is said to comprise either a plurality of identical disks or a plurality of other identical redundancy groups.

A heterogeneous redundancy group comprises storage disks of different types with respect to disk vendors, models, capacities, I/O performances, or associated classes of storage assigned by administrator or a storage management system (SMS). A heterogeneous redundancy group may also contain other redundancy groups that are different either with respect to the types of disks that those (contained) groups in turn contain, or their corresponding replication schemes. For instance, a mirrored redundancy group that contains a RAID-5 group and a RAID-6 group is considered to be heterogeneous.

Further, each disk in the data volume is associated with a property referred to as a class of storage which is either:
  Derived by the system based on the storage characteristics including: model, vendor, capacity, I/O latency, I/O throughput.
  Assigned by an administrator via storage management interface, or an automated storage management system (SMS).

Figure 1:
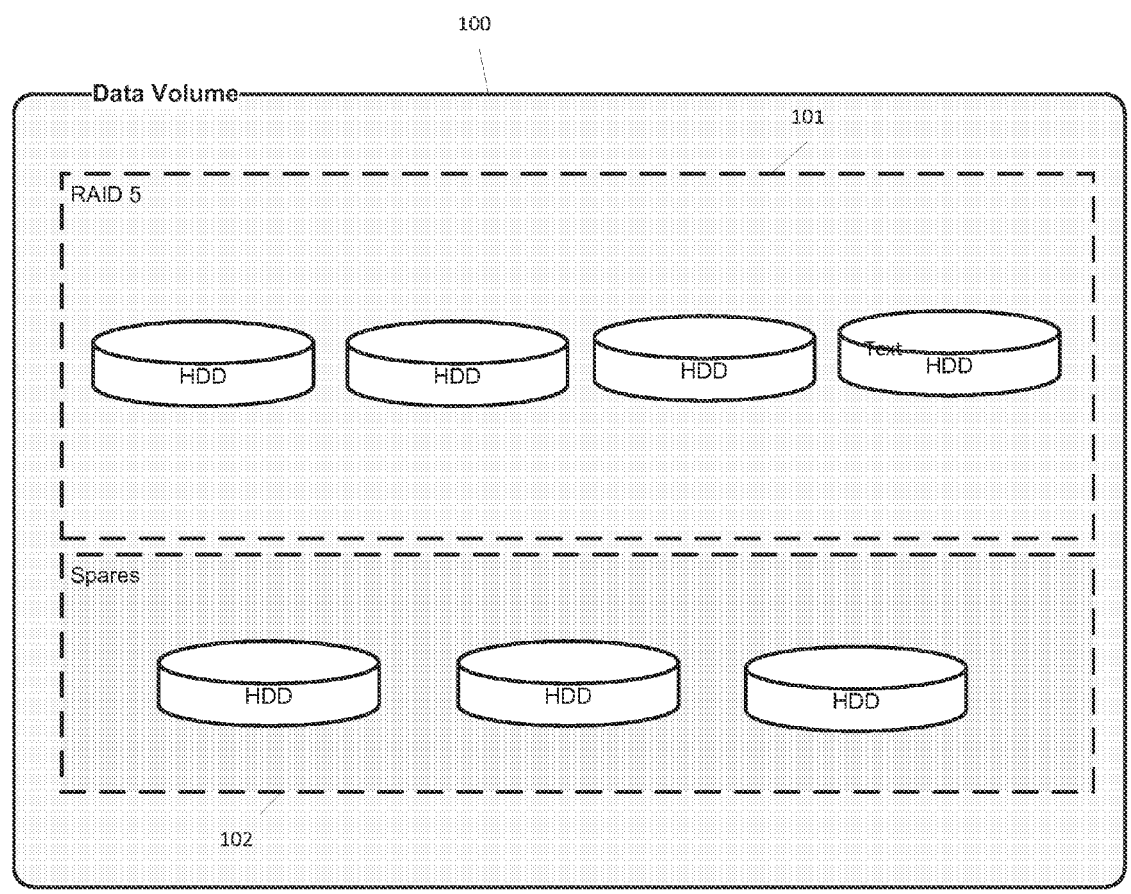
FIG. 1 illustrates a typical data volume with a single RAID-5 group, including a plurality of four data disks and three spare disks.
Figure 2:
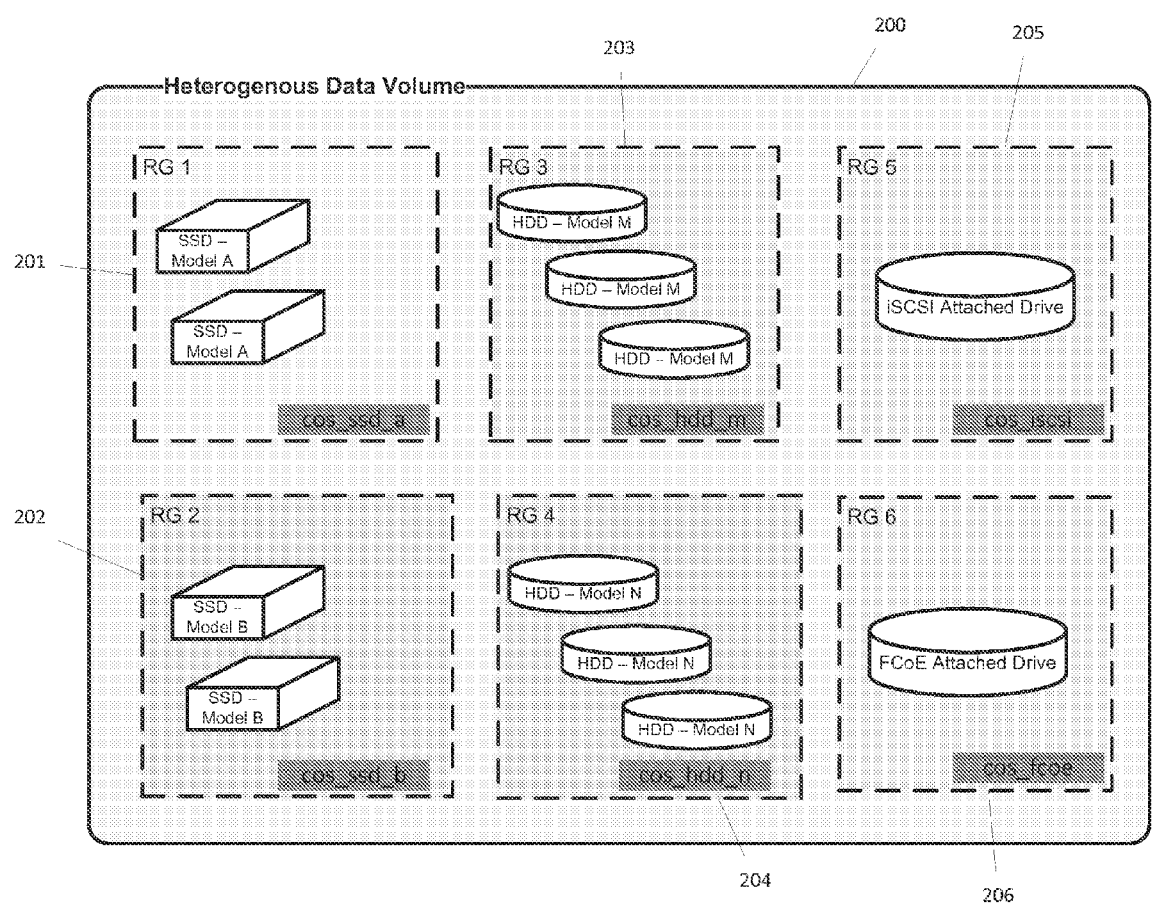
FIG. 2 illustrates a heterogeneous data volume in RAID-0 configuration including six redundancy groups (RG1-RG6) with distinct classes of storage 'cos_ssd_a', 'cos_ssd_b', 'cos_hdd_m', 'cos_hdd_n', 'cos_iscsi', and 'cos_fcoe' associated with 'model A' SSDs, 'model B' SSDs, 'model M' HDDs, 'model N' HDDs, iSCSI attached drives, and FCoE attached drives, respectively.

A class of storage associated with each storage disk is a named set of properties that in combination reflect characteristics of the storage device as well as operations performed on data prior to storing the data. FIG. 2 illustrates a heterogeneous data volume 200 in a RAID-0 configuration with distinct classes of storage named 'cos_ssd_a', 'cos_ssd_b', 'cos_hdd_m', 'cos_hdd_n', 'cos_iscsi', and 'cos_fcoe'. In the embodiments, a class of storage includes the following additional attributes: Number of copies: a numeric value that denotes the number of copies of the logical block to be stored when the logical block is being written to the heterogeneous data volume. For RAID-1 and other mirrored schemes, this provides for the capability to store extra copies, in addition to those produced by mirroring. For non-mirrored replication schemes this of course provides for the functionality that is similar to mirroring, that is storing full copies of data on RAIDs of different levels.

Data access mechanisms: In embodiments of the present invention, each class of storage defines certain data reading and data writing mechanisms optimized for reading and writing the corresponding storage medium.

Read preference: In presence of multiple copies stored on different disks in a heterogeneous data volume the "read preference" or "read preference value" determines which particular disk is accessed to read a copy of the logical block. In the embodiments, read preference is implemented in a variety of ways including a statically defined scheduling weight assigned to each disk, or a dynamically computed value based on, for instance, current numbers of per-disk pending I/O operations.

Asynchronous write: When a logical block is written with multiple copies (which includes both the case of mirrored replication scheme and the case of explicitly specified "number of copies>1" attribute of the corresponding class of storage), an "asynchronous write" property for a disk or a redundancy group specifies that the write can be asynchronous. A write operation for the logical block can return to the caller without the completion of write to this disk or redundancy group.

In addition to the attributes mentioned above, class of storage can have attributes that specify operations on the data performed before it is getting stored on a heterogeneous data volume. The operations include compression, encryption and de-duplication.

In one embodiment, compression is an additional attribute of classes of storage associated with storage disks. Compression denotes an algorithm to be used for compressing the data before it is written to the corresponding storage disks, examples include gzip, lzjb, and other lossless compression algorithms.

In another embodiment, encryption is an additional attribute of classes of storage associated with storage disks. Encryption denotes an algorithm to be used for encrypting the data before it is written to the corresponding storage disks, examples include shared secret encryption mechanisms such as DES, AES, as well as public key encryption mechanisms.

Each redundancy group in the heterogeneous data volume is by default associated with a composite class of storage which is a logical disjunction of classes of storage of its children: contained disks and redundancy groups.

Each logical block in the I/O path is associated with a basic or composite class of storage which is assigned by the system or SMS, or by the application that issued the I/O request.

A system and method in accordance with the present invention groups the disks and redundancy groups together with a basic or composite class of storage property and applies data access mechanism associated with the class of storage to store/retrieve data.

In embodiments of the present invention, data access mechanisms associated with specific classes of storage are optimized for accessing (reading and writing) the corresponding storage medium. For instance, when writing to SSDs, it is generally preferable to avoid queuing and reordering (sorting) of writes—the techniques that are typically used when writing to conventional rotating drives. This can be expressed via specialized data writing mechanism that would map onto the corresponding class of storage (for instance, 'cos_ssd') in accordance with the present invention. Similarly, class of storage associated with SSDs can be associated with a data read mechanism that avoids read reordering and prefetching, due to the fact that SSDs have zero seek time.

A parent/child relationship in a heterogeneous data volume, whereby a volume contains redundancy groups that in turn contain (child) redundancy groups and/or disks, implies inheritance of properties: from volume to contained groups of disks to disks. In a preferred embodiment, any class of storage property can be overridden or updated by administrator or SMS, independently of whether this property was inherited from a parent in a (volume, redundancy group, disk) containment, or assigned by the system based on auto-detected characteristics of the corresponding storage media.

Class of storage associated with logical blocks being read from or written to a heterogeneous data volume can be updated dynamically at runtime, based on a system runtime context available in the I/O path. The runtime context can include data classification policies and classes of data for which the dynamic modification is enabled or disabled.

For instance, a system in accordance with the present invention can identify that a given filesystem is being accessed frequently for reading a certain subset of files or directories stored on HDDs. Performance of applications issuing the corresponding read operations can be significantly improved if the reads are directed to read-optimized SSDs. Hence, the class of storage for the frequently accessed file-system objects can be updated dynamically to a class of storage that maps to read optimized SSDs.

In one embodiment, classes of storage are dynamically updated at runtime using the existing art of managing I/O caches in memory. The corresponding algorithms that often employ most frequently used (MFU) and/or least recently used (LRU) counters are used in this embodiment to automate data migration between solid state drives, conventional hard drives and remotely attached LUs (Logical Units). This embodiment effectively implements hierarchy of persistent caches over variety of the heterogeneous volume contained storage media with different classes of storage and different I/O performance characteristics.

A system and method in accordance with the present invention allows leveraging a proven existing art of cache algorithms that includes a family of LRU algorithms, Adaptive Replacement Cache (ARC) and others, whereby "eviction" from cache is implemented as automated migration of the corresponding data items to slower, or less expensive, or remote storage. The tradeoff between storage capacity and I/O performance is thus being addressed at the system level. In the embodiment, the present invention provides for automated rebalancing of the most frequently accessed data to fast and more expensive local drives that in turn often have orders of magnitude less capacity than the remote and/or cheaper storage media.

One of ordinary skill in the art will appreciate that persistent heterogeneous storage can be managed optimally and transparently from users, based on existing art of managing I/O caches in memory.

A system that utilizes the present invention can take the form of an implementation done entirely in hardware, entirely in software, or may be an implementation containing both hardware-based and software-based elements. In some embodiments, this disclosure may be implemented in software, which includes, but is not limited to, application software, firmware, resident software, program application code, microcode.

Furthermore, the system and method of the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program or signals generated thereby for use by or in connection with the instruction execution system, apparatus, or device. Further a computer-readable medium includes the program instructions for performing the steps of the present invention. In one implementation, a computer-readable medium preferably carries a data processing or computer program product used in a processing apparatus which causes a computer to execute in accordance with the present invention. A software driver comprising instructions for execution of the present invention by one or more processing devices and stored on a computer-readable medium is also envisioned.

The medium can be an electronic, magnetic, optical, electromagnetic, infrared, or semiconductor system (or apparatus or device) or a propagation medium, or a signal tangibly embodied in a propagation medium at least temporarily stored in memory. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Specific embodiments of the invention will now be described in detail by referring to the accompanying pictures where ever necessary.

FIG. 2 illustrates a heterogeneous data volume 200, with a plurality of six redundancy groups 201-206, each of the redundancy group comprising homogeneous storage mediums in the order—'Model A' SSD, 'Model B' SSD, 'Model M' HDD, 'Model N' HDD, iSCSI attached Drive and FCoE attached Drive, where each disks are assigned class of storage in the order 'cos_ssd_a', 'cos_ssd_b', 'cos_hdd_m', 'cos_hdd_n', 'cos_iscsi', and 'cos_fcoe'. Since the redundancy groups in this figure include only homogenous disks, class of storage of redundancy group is same as that of the disks in the redundancy group.

One of ordinary skill in the art will appreciate the benefits provided by a system illustrated in FIG. 2. At write time, data assigned a particular class of storage will be routed only to the disks that have a matching class of storage. For instance, data that requires minimum I/O latency (for instance, database indexes) can be stored with class of storage 'cos_ssd_a' or 'cos_ssd_b'; when the corresponding writes are performed, this data will be routed to redundancy group RG1 201 or redundancy group RG2 202. On the other hand, a backup or archival data (for instance, older email archives) could be assigned class of storage 'cos_iscsi' or 'cos_fcoe'; this data will then be routed to RG5 205 or RG6 206.

Data with a composite class of storage can make use of multiple redundancy groups so that data can be striped. For example, data that needs continuous backup can be assigned a composite class of storage 'cos_hdd_m|cos_iscsi', where the resulting class of storage is the logical disjunction of 'cos_hdd_m' and 'cos_iscsi'. Assigning a number of copies to two copies for this composite class of storage would then result in two copies—one copy in RG3 203 and one in RG5 205.

Hierarchical Storage Management (HSM) is a technique where the storage resources allocated for a particular file can evolve over time without changing the contents of the file or the file name used to reference it. When a file is new, HSM may extensively replicate the file both for protection and to facilitate heavy parallel access. As the same file becomes older, an HSM system may migrate the file so that protection of its payload is provided by offline archives, such as tapes or cheaper SATA drives, rather than top-grade hard drives or solid state drives.

In one embodiment, the system illustrated in FIG. 2 performs hierarchical storage management by designating different classes of storage to (a) the data to be stored locally and (b) the data to be stored remotely—the latter for instance on the iSCSI attached drives. By setting policies for data migration from local storage to remote storage, an automated HSM can be then facilitated. One common policy may be setting maximum interval of time since a locally stored file was accessed. Once this interval expires, the corresponding file is assigned class of storage 'cos_iscsi'.

Subsequently, this file is migrated to the corresponding iSCSI attached drives that have themselves associated classes of storage denoted as 'cos_iscsi' (FIG. 2). Data migration can be performed in a variety of ways known in the art. An application, a script, or any known in the art mechanism that performs migration will eventually write each data block that constitutes the original file back to the heterogeneous data volume, onto the drives of the heterogeneous data volume that have the matching class of storage—'cos_iscsi' in this example.

One of ordinary skill in the art will appreciate that a system and method in accordance with the present invention enables HSM implementations to leverage per class of storage writing and reading mechanisms by simply modifying, with respect to configured HSM policies, a class of storage assigned to a given data item or a given dataset that is stored on a heterogeneous data volume.

Further, HSM applications can be enhanced to dynamically and continuously migrate data between the disks and redundancy groups of the heterogeneous data volume. In one embodiment, a third party HSM product is configured to modify at runtime classes of storage of the files stored on a heterogeneous data volume. Migration of the files that are downgraded or upgraded by the HSM with respect to their corresponding classes of storage is facilitated via existing and known in the art data migration algorithms. The per class of storage I/O access mechanism and storing of the data blocks that constitute migrating files onto the corresponding (matching) disks is provided by the present invention.

Figure 3:
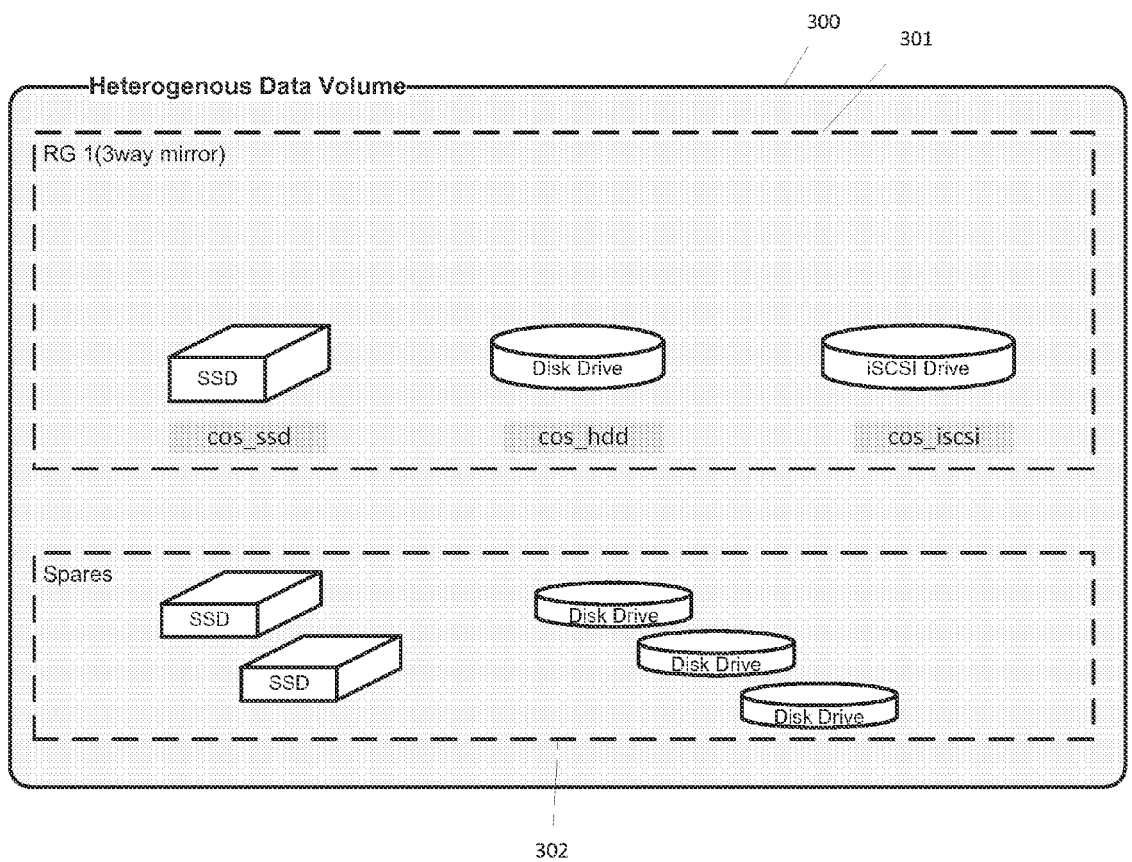
FIG. 3 illustrates a heterogeneous data volume configured with a single redundancy group (RG1) as a three way mirror with distinct classes of storage accounting for SSD, HDD and iSCSI drives.

FIG. 3 illustrates a heterogeneous data volume 300 that has a single redundancy group 301 configured as a three way mirror with three storage mediums of different type. The heterogeneous data volume 300 also includes two spare SSDs and three spare HDDs are located in spare area 302. Redundancy group RG1 301 comprises an SSD with class of storage 'cos_ssd', and HDD with class of storage 'cos_hdd' and an iSCSI attached Drive with class of storage 'cos_iscsi'. In this embodiment, class of storage of the redundancy group RG1 301 is a logical disjunction of classes of storage of the contained disks: 'cos_ssd|cos_hdd|cos_iscsi'. Due to the parent child relationship, all the disks in the redundancy group inherit this composite class of storage for any I/O operation and hence any data with class of storage 'cos_ssd', 'cos_hdd', 'cos_iscsi' or any combination of these will be copied to all the three disks.

The system as illustrated by FIG. 3 can perform as an integrated backup wherein, the class of storage 'cos_iscsi' will act as the backup for the data. This system with the class of storage 'cos_iscsi' being configured for asynchronous writes will perform the writes to remote attached drives asynchronously. This will allow the write request to not have to wait for the slower writes to remote attached drives.

The reading mechanism of the embodiment of FIG. 3 makes sure that the reads are performed giving more (reading) preference to 'cos_ssd', less to 'cos_hdd' and the least—to 'cos_iscsi'.

Figure 4:
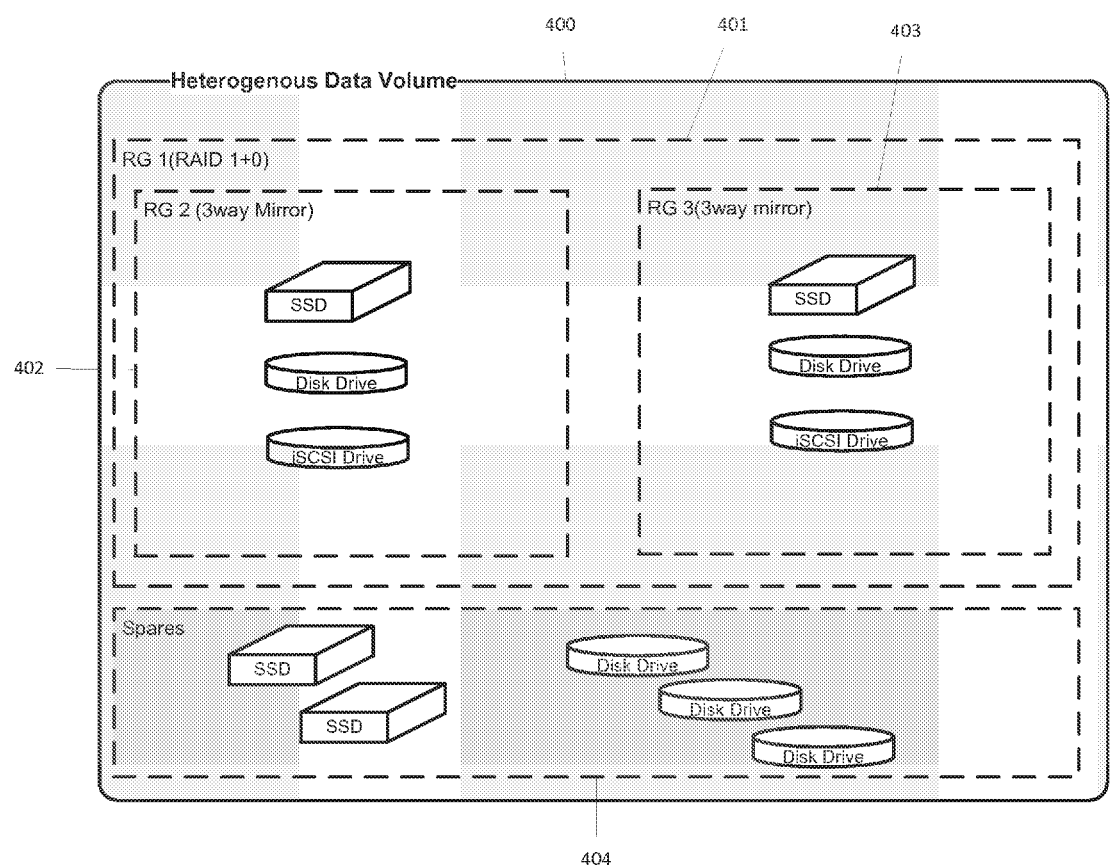
FIG. 4 illustrates a heterogeneous data volume configured with a single redundancy group (RG1) in RAID 1+0 scheme.

FIG. 4 illustrates a heterogeneous data volume 400 with a single redundancy group 401 configured in RAID-1+0. Redundancy group RG1 401, in turn, comprises two redundancy groups—redundancy group RG2 402 and redundancy group RG3 403 in RAID-0 configuration wherein these redundancy groups comprises three disks as a three way mirror. The disks are SSD with class of storage 'cos_ssd', HDD with class of storage 'cos_hdd' and an iSCSI attached drive with class of storage 'cos_iscsi'. One of ordinary skill in the art will appreciate that this modified RAID-1+0 scheme provides additional benefits of improved I/O performance along with availability of remote copy of data on iSCSI attached drives. The heterogeneous data volume 400 also includes two spare SSDs and three spare HDDs are located in spare area 404.

In one embodiment, a request to write a logical block to the data volume as illustrated in FIG. 4 is processed as follows.

First, a logical block of data is received and class of storage of the logical block is matched with the class of storage of the redundancy group. The redundancy group RG1 401 is selected for writing this logical block, and then the total number of data blocks to be allocated in this redundancy group is calculated based on its replication scheme (that is, RAID-1+0).

Next, one of child redundancy groups, RG2 402 or RG3 403, is selected for this logical block based on the previous write. Once a particular redundancy group is selected, a number of data blocks for this redundancy group are calculated.

FIG. 4 illustrates 3-way mirror replication scheme, whereby each of the depicted redundancy groups has one SSD, one HDD and one iSCSI attached drive. For each data block to be written the data writing mechanism of the corresponding class of storage is chosen and the data is then written to the disk using this selected data writing mechanism. Finally, write completion is reported back to the application which requested the write operation.

This embodiment provides for disaster recovery, with iSCSI attached drives in redundancy group RG2 402 and redundancy group RG3 403 being utilized for built-in remote backup. One of ordinary skill in the art will appreciate that no separate backup software is needed to facilitate this operation—the drives are effectively mirrored remotely as part of the built-in RAID operation of the heterogeneous data volume.

In the embodiments, the class of storage ('cos_iscsi') associated with these remote iSCSI drives from RG2 402 and RG3 403 can have asynchronous write property enabled or disabled, depending on several factors including distance, available bandwidth, and whether the corresponding (iSCSI Initiator, iSCSI Target) nexus has a dedicated set of network interfaces.

Figure 5:
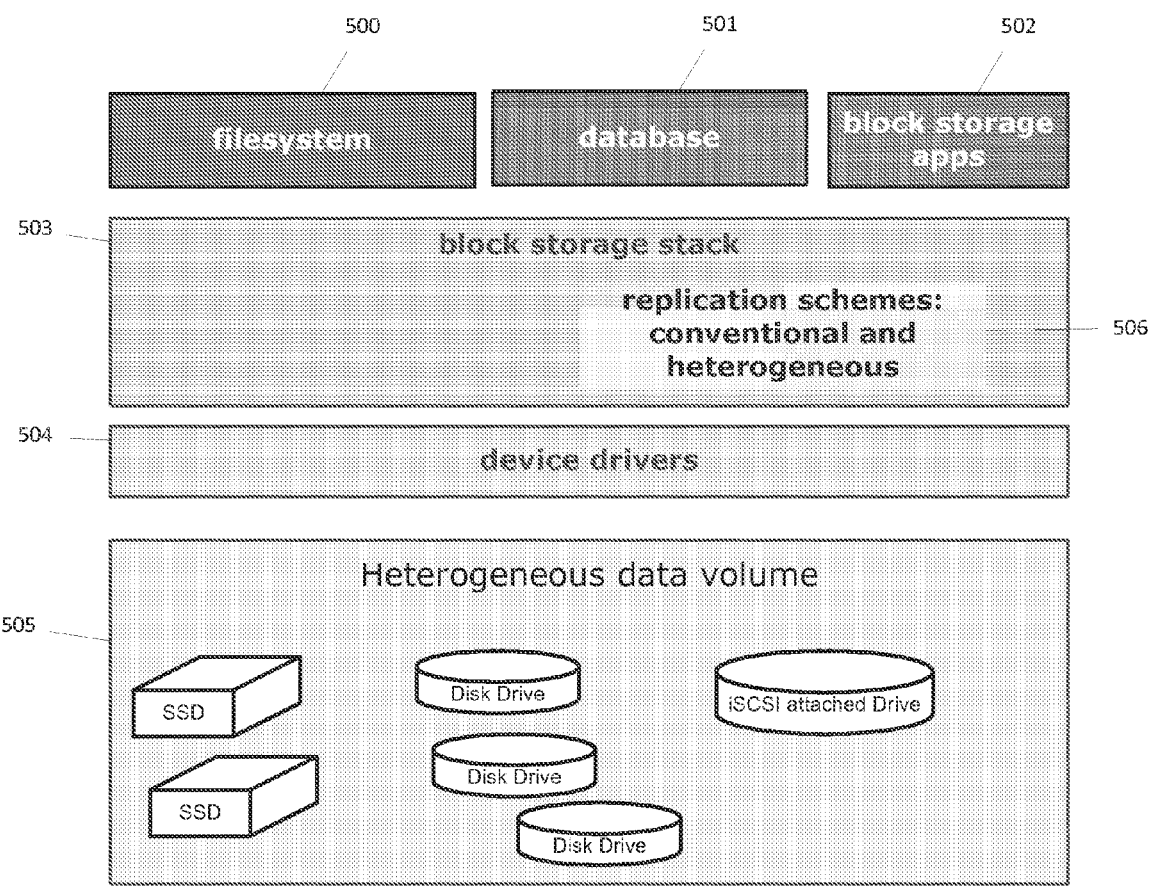
FIG. 5 and FIG. 6 illustrate system architectures in accordance with embodiments of the present invention.
Figure 6:
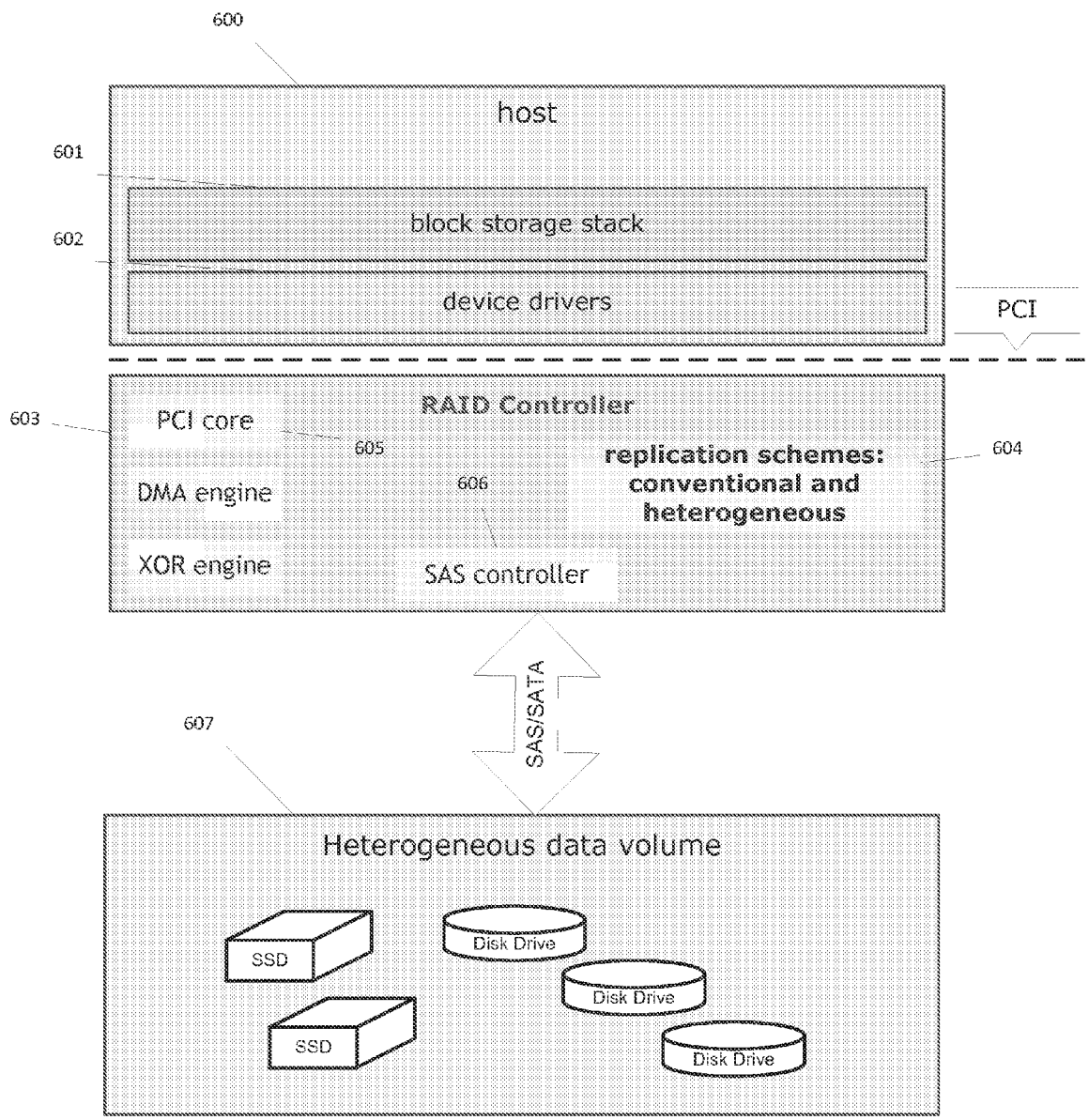

FIG. 5 and FIG. 6 illustrate system architectures, in accordance with the embodiments of present invention. The system architecture as depicted by FIG. 5 illustrates a filesystem 500, database engine 501 and other block storage applications 502 that interact with the bock storage stack 503. The block storage stack 503 accounts for the software that handles replication logic 506, including both the conventional replication schemes as well as the enhanced replication schemes in accordance with the present invention. The block storage stack 506 uses device drivers 504 to control storage interconnects (SAS, SATA, FC, FCoE, iSCSI, USB, etc.) and interface with a heterogeneous storage array 505.

Heterogeneous data volume combines plurality of storage disks organized in a variety of replication schemes. In one embodiment, block storage stack 503 as shown in FIG. 5 handles the replication (RAID) schemes of the heterogeneous data volume. In the embodiment, an operating system handles the replication schemes, while a storage array controller merely has to handle writing and reading data to/from the storage array.

A method and system in accordance with the present invention provides for the RAID enhancements to support heterogeneous arrays with advanced features discussed above. The corresponding embodiments will reuse iSCSI and FC stacks that are also currently available in all major operating systems.

FIG. 6 shows an alternate architecture, wherein a method and system in accordance with the present invention. The system architecture includes a host 600, a RAID controller 603 and a heterogeneous storage array 607 connected to the RAID controller 603. RAID controller 603 provides for the RAID logic that supports conventional RAID schemes and the advanced heterogeneous RAID schemes in accordance with the present invention. RAID controller also includes modules that provide for PCI 605 and other functions. The host runs an operating system that includes block storage stack 601 that in turn uses the device drivers 602 to interface with the RAID controller 603.

The RAID controller 603 interfaces with the data volume via SAS, SATA, FC, FCoE, iSCSI and other compliant storage inter-connects managed by the corresponding modules (for instance, SAS controller 606 shown on the figure) within the RAID controller itself. The SAS controller 606 will provide attachment to SAS and SATA drives; more than a single type of transport controller can be added to provide for multiple I/O access mechanisms. The RAID controller 603 handles replication logic 604, including both the conventional replication schemes as well as the enhanced replication schemes in accordance with the present invention.

In one embodiment, FIG. 6 illustrates the system architecture as an embedded solution. This enables the hosts that do not have the enhanced block storage stack as illustrated in FIG. 5 to make use of the advantages as outlined by the method and system of the present invention.

A RAM Disk (also referred to as RAM drive or ramdisk) is a block of random access memory (RAM) that is utilized to emulate a disk drive. The corresponding computer software is often implemented as a RAM Disk block level driver. A RAM Disk will provide a superior I/O performance at the price of not providing for data persistency. Capacity of RAM disks is also limited by the size of RAM and generally is expected to be orders of magnitude smaller than the capacity of stable storage.

In one embodiment, heterogeneous data volume combines RAM disk and other type of storage media. The latter is a non-volatile storage and can be remote attached block storage, HDDs, SSDs or any combination thereof. This configuration provides for all the enhanced features of the present invention, whereby SSDs act as a persistent non-volatile cache, HDDs are utilized for the primary storage, and remote (iSCSI, FC, FCoE) attached storage is designated for the backup and dynamic HSM capabilities. SSDs and RAM disks can be configured to be in a mirrored configuration, with read preference set to the RAM disks. Read operations are therefore satisfied from RAM disk with I/O latency and I/O throughput comparable to the latency and throughput of RAM.

One of ordinary skill in the art will appreciate that read preference in this case is statically configured as: "always read from the RAM disk part of the mirror".

This configuration is best suited for applications with extremely high requirements on read performance of a fairly limited datasets. It is of course possible, although expensive, to deploy hundreds of gigabytes of RAM as RAM Disks.

Figure 7:
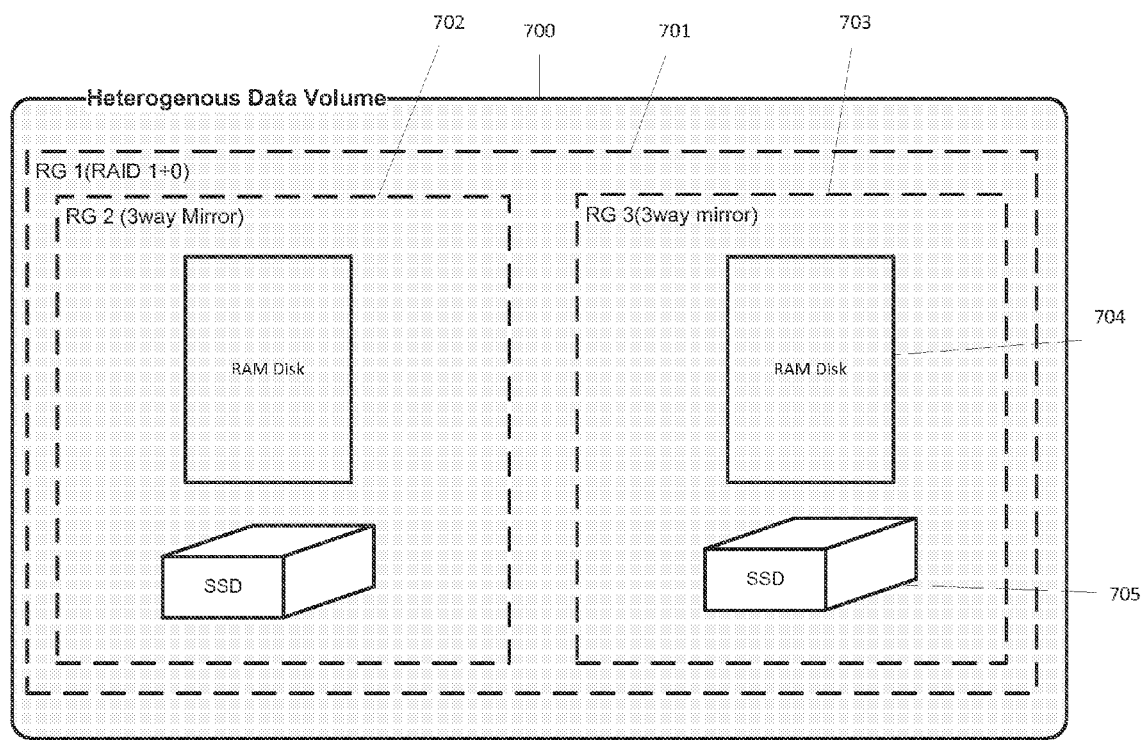
FIG. 7 illustrates heterogeneous data volume with a single redundancy group (RG1) in RAID 1+0 scheme.

In preferred embodiments of this invention, SSDs in heterogeneous data volumes are automatically detected. Further, if an SSD is mirrored with a drive or drives that have higher I/O latency and/or lower I/O throughput, read preference value is computed to select the SSD for reading more frequently than the slower drives. This is implemented in a variety of ways including a statically defined scheduling weight (example: 3 out of every 4 reads use SSD), or a dynamically computed value based on, for instance, current numbers of per-disk pending I/O operations FIG. 7 illustrates a heterogeneous data volume 700 configured as RAID-1+0. Data volume 700 comprises a top level redundancy group RG1 701 which in turn comprises of two redundancy groups RG2 702 and RG3 703 in RAID-0. RG2 702 and RG3 703 are two way mirrors with a RAM Disk 704 and SSD 705.

This embodiment is optimized specifically for applications that require both high performance and high availability of data. Writes to this data volume gets striped across segments of RG1, and the resulting stripes are then mirrored inside RG2 702 and RG3 703. In one embodiment, the class of storage associated with a SSD is in turn associated with an asynchronous writing mechanism, so that write requests do not block on the SSD and perform at the latency of accessing the RAM Disk. For read operations, RAM Disk can have the read preference property statically set so that read operations access only the RAM Disk to retrieve the data.

One of ordinary skill in the art will notice that after system reboot the RAM Disk will be empty; in a mirrored configuration it will be subsequently rebuilt in the background from the non-volatile stable storage such as the SSD.

Figure 8:
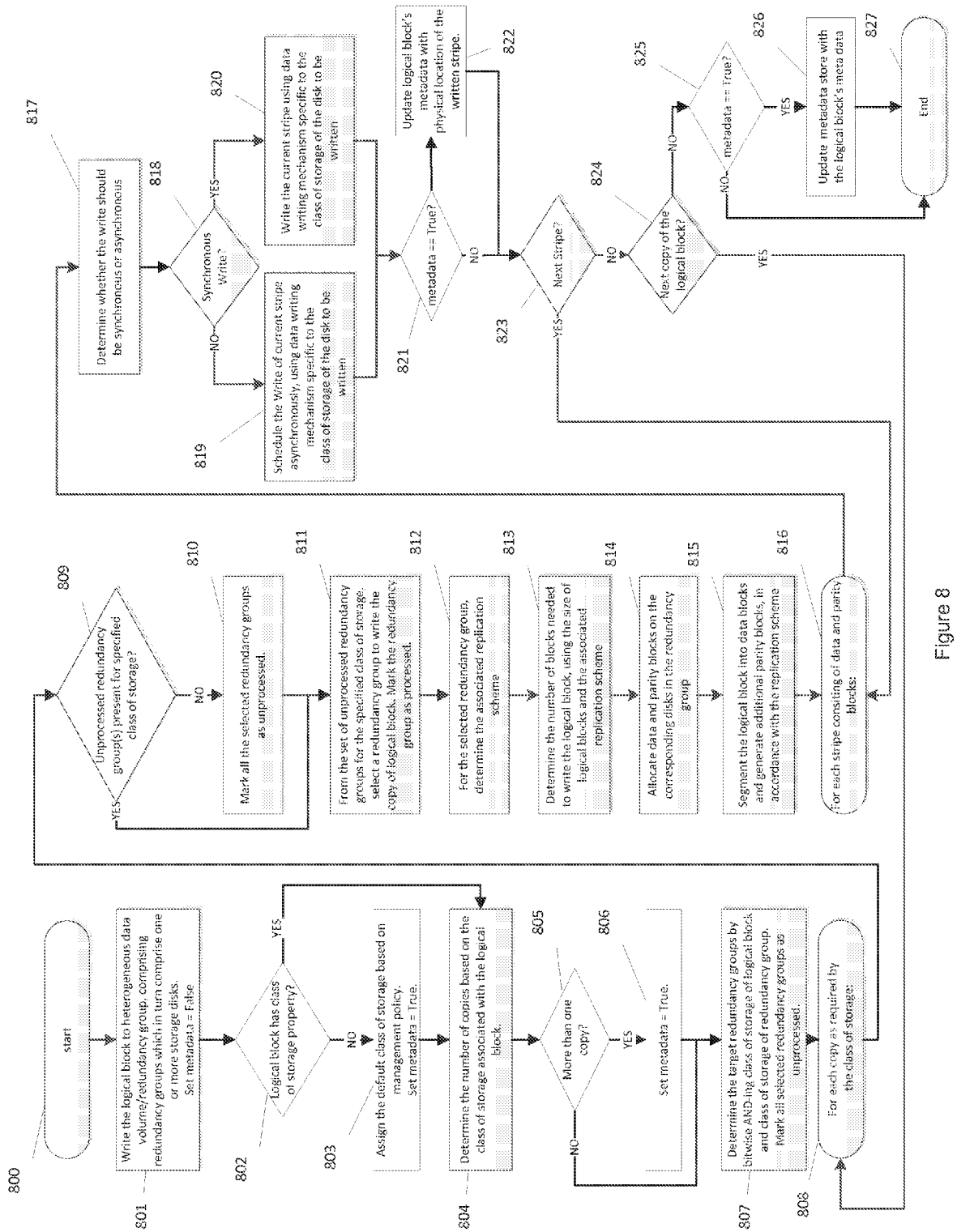
FIG. 8 shows a flowchart for writing a logical block to the heterogeneous data volume.

FIG. 8 shows a flowchart for writing a logical block of data to the heterogeneous data volume in accordance with one embodiment starting at step 800. Initially a request for writing a logical block is received, via step 801.

Next, a check for class of storage associated with the logical block is made, via step 802. If the application that uses data volume to store/retrieve data is not heterogeneous data volume aware, the logical block will not be associated with any class of storage. If logical block is not associated with any class of storage, default class of storage is assigned to the logical block, via step 803. A default class of storage is determined by the predefined policies set by the administrator or SMS with regard to the application that initiates the write request.

One of ordinary skill in the art will appreciate that the present invention provides for existing applications to leverage the features of heterogeneous data volume without modifying the application. For instance, a class of storage can be associated on a per filesystem basis, which would mean that the corresponding data will be routed to the corresponding matching drives of the heterogeneous data volume.

If the application is not heterogeneous data volume aware, the data volume needs to store certain extra information regarding this logical block. This information is stored as logical block metadata in the data volume. Requirement for the metadata is flagged for this logical block, via step 803.

Further, the number of copies for the logical block based on its class of storage property is determined, via step 804. If the class of storage property for this logical block specifies more than one copy, the details of extra copy need to be maintained in the metadata. A requirement for metadata is flagged, via step 806 if the check for more than one copy, via step 805 is true.

Next, the target redundancy groups for storing this logical block is determined by matching class of storage of logical block and classes of storage of redundancy groups, via step 807. In one embodiment, this is performed by bitwise ANDing the class of storage of logical block and the class of storage of the redundancy group.

Once the redundancy groups for this logical block are selected, all the selected redundancy groups are marked as unprocessed. All the copies for this logical block have to be accommodated in the selected set of redundancy groups. Initially, all the selected redundancy groups are marked as un-processed via step 807. For each copy of the logical block, via step 808, target redundancy groups to write the copy to, have to be selected. In one embodiment, this is performed by determining the pending I/O operations on the selected unprocessed redundancy groups, determining if there are unprocessed redundancy groups present for a specified class of storage via step 809, marking all of the selected redundancy groups as unprocessed if such determination is false via step 810 and then selecting the redundancy group with the least pending number of I/O operations, via step 811. This logic evenly distributes I/O operations across the redundancy groups and their storage disks.

Once a target redundancy group for the copy of the logical block is selected, replication scheme of the redundancy group is determined, via step 812 and number of blocks needed to store this copy is determined based on the replication scheme and size of the logical block, via step 813. Data and parity blocks are allocated on the disks of the redundancy group, via step 814. Further, the logical block is segmented into data blocks and parity is calculated if needed based on the replication scheme, via step 815. Each data block is then written to the corresponding storage disks, via step 816.

Based on the associated class of storage and its properties, write operation can be synchronous or asynchronous. It is determined whether the write should be synchronous or asynchronous via step 817. If it is determined that the write is not synchronous via step 818, via step 819, the write operation is scheduled and control is returned back to the caller. If it is determined that the write is synchronous via step 818, via step 820, the write operation is issued to the disk and write request from the caller is blocked until the write operation has made it to the disk.

Before the data block is written to the disk, operations are performed on the data block based on the attributes of the class of storage associated with the disk. For instance, data block is compressed using gzip algorithm if the compression attribute of the class of storage associated with the disk is set to gzip.

Next, if a requirement for metadata was flagged previously for this logical block as determined via step 821, then the logical block's metadata is updated with the physical location of the written stripe, via step 822. It is determined via step 823 if a next stripe is to be written. If true, step 816 is repeated. If false, step 824 is executed. It is determined at step 824 if the next copy of the logical block is to be processed. If true, step 816 is repeated. If false, step 825 is executed. At step 825, it is determined if the requirement for metadata was flagged previously for this logical block. If false, the process ends at step 827. If true, step 826 is executed.

Once all the stripes for the logical block are written, and if the requirement for metadata was previously flagged, via step 803, the metadata associated with this logical block is written as well, via step 826.

The algorithm illustrated in FIG. 8 is recursive in accordance with the recursive definition of the redundancy group. Each write operation initiated in any redundancy group that comprises one or more redundancy groups is processed recursively in accordance with the same algorithm illustrated on FIG. 8.

Figure 9:
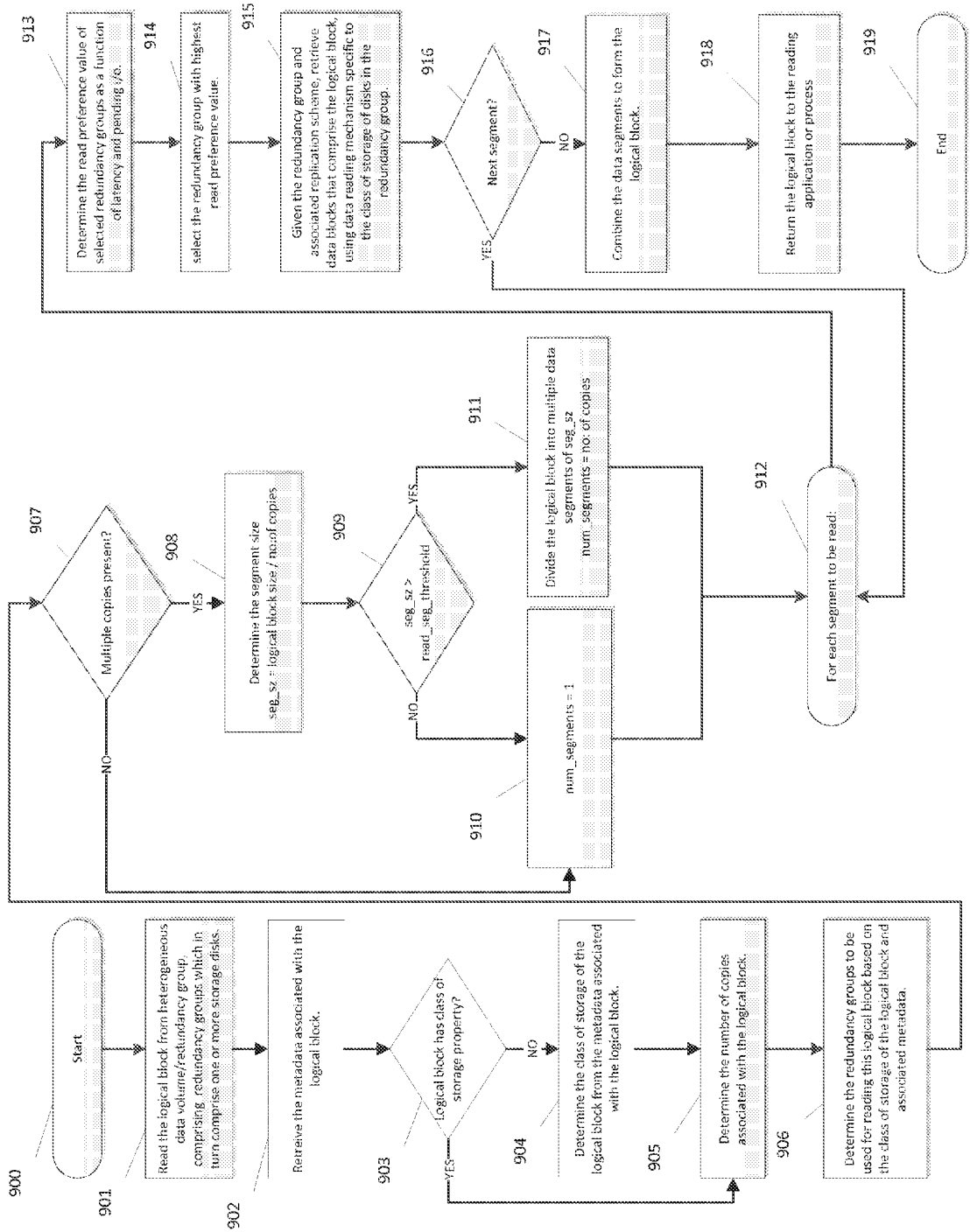
FIG. 9 shows a flowchart for reading a logical block from a heterogeneous data volume.

FIG. 9 shows a flowchart for reading a logical block from the heterogeneous data volume in accordance with one embodiment of the present invention starting at step 900. Initially a request is received to read a logical block from the data volume, via step 901.

The logical block can have metadata associated with it, if the application that had written this logical block was not heterogeneous data volume aware or the class of storage associated with this logical block specified more than one copy. The metadata associated with this logical block, if exists, is retrieved, via step 902.

Further, if the logical block is not associated with any class of storage, via a determination performed at step 903, the class of storage is determined from the metadata associated with the logical block, via step 904. From the class of storage property associated with the logical block and associated metadata of the logical block, number of copies of the block in the data volume is determined, via step 905.

Further, redundancy groups holding the logical block, is determined. In one embodiment this determination is made by bitwise AND-ing of the class of storage of the logical block and class of storage of the redundancy groups in the data volume, via step 906. If multiple copies are present, via step 907, determination is made whether the logical block is read in parallel from all the redundancy groups that store a copy of this logical block.

Step 908, calculates the data segment size by dividing logical block size by number of copies. Next, if the segment size is greater than a configured segment size threshold denoted as 'read_seg_threshold', the logical block is read by simultaneously reading the data segments from the multiple copies. Embodiments of the present invention provide for configuring the 'read_seg_threshold' by the administrator or SMS.

Next, the number of data segments is determined based on above calculation and each segment is read by issuing the read operation in parallel. Number of segments can be one if there is a single copy of the logical block or the calculated value of the segment size is less than the 'read_seg_threshold'. It is determined whether the calculated value of the segment size is greater than the 'read_seg_threshold' via step 909. If false, step 910 is executed. At step 910, the 'num_segments" is set to be equal to 1. If the determination at step 909 is true, the logical block is divided into multiple data segments of the segment size, and the 'num_segments' set to be the number of copies at step 911. The process then proceeds to step 912.

Further, for each segment, via step 912, a redundancy group for reading the segment is selected. In an embodiment, this selection is done based on a read preference value which is calculated dynamically based on the performance and the pending I/O operations on the redundancy group/disks, via step 913. Redundancy group with maximum read preference value is then selected, via step 914. Once the redundancy group or disk is selected for reading the copy of the logical block, the replication scheme is determined, and the data segment is retrieved using the data access mechanism specific to the class of storage associated with this redundancy group/disks, via step 915.

It is determined whether there is a next segment to be read via step 916. If true, step 912 repeats. If false, step 917 is executed. Once all the segments are read, the logical block is formed by combining all the segments, via step 917 and is then returned back to the application that issued the read request, via step 918. The process ends at step 919.

The algorithm illustrated in FIG. 9 is recursive, with respect to nested redundancy groups. If a given (parent) redundancy group comprises other (child) redundancy groups, a read operation on the parent redundancy group is passed to its children for execution.

The read and write logic described herein may be implemented in the software, firmware, hardware, or any combination of the above. A method and system in accordance with the present invention provides applications (such as filesystems, databases, search engines, cloud storage systems) to utilize faster, more expensive and possibly smaller in size disks for different types of data (e.g. database index), while at the same time leveraging existing, well-known and proven replications schemes (such as RAID-1, RAID-5, RAID-6, RAID-1+0, etc.). In addition, embodiments provide for integrated backup and disaster recovery, by integrating different types of disks, some of which may be remotely attached, in a single (heterogeneous) data volume.

The present invention supports existing, heterogeneous storage unaware, applications. Such applications will not associate class of storage with logical blocks upon writing and reading those blocks to/from the heterogeneous data volume. For such applications the invention provides for additional metadata associated with each written logical block. This metadata accounts for the class of storage of the logical block and physical location of extra copies of this logical block, as required by the corresponding class of storage. This makes it possible for existing applications to make use of the embodiments of this invention without any modifications.

Storage and system administrators can set policies that govern how the data is stored on and retrieved from a heterogeneous data volume outside the applications that use the volume. A class of storage can be associated on a per filesystem basis, which would mean that the corresponding data will be routed to the corresponding matching drives of the heterogeneous data volume. For instance (FIG. 2, FIG. 3, and FIG. 4), administrator can assign 'cos_ssd' class of storage to a filesystem holding data that needs low latency access. The matching devices in the volumes shown on FIG. 2, FIG. 3, and FIG. 4 will be SSDs. One of ordinary skill in the art will appreciate the fact that unmodified applications can leverage enhanced capabilities provided by this invention at a granularity of the application.

Existing applications, such as filesystems and databases supported by modern Operating Systems (OS), typically make use of OS-specific control data structure to pass logical blocks to the block storage stack. This data structure encapsulates the details such as logical block size and offset, data payload of the logical block, type of I/O preferred, callback mechanism for I/O completion, and flags. This control data structure can be modified to include class of storage. This in turn enables the applications to specify class of storage at any level of granularity including the most fine-grained: on a per logical block basis.

In one embodiment, Zettabyte File System (ZFS) is used to implement the method and system in accordance with the present invention. ZFS pool is enhanced to provide the functionality of heterogeneous data volume.

ZFS is a 128-bit filesystem developed originally by Sun Microsystems, and currently supported by OpenSolaris, Illumos and FreeBSD Operating Systems. ZFS has a layered architecture which includes ZFS POSIX Layer (ZPL)—which is the POSIX compatibility layer giving POSIX filesystem interface to users and applications, Dataset and Snapshot Layer (DSL) which manages the datasets and snapshots, Data Management Unit (DMU)—which manages the data from DSL as Objects, and Storage Pool Allocator (SPA)—which manages the storage disks. ZFS follows a transactional model, whereby I/O operations either make it as a whole to the stable storage, or not. I/O operations in ZFS are executed in multiple stages referred to as pipelines, and are represented by zio_t structure.

ZFS groups storage disks into redundancy groups, whereby each group implements a certain replication scheme: 2-way mirror, raidz1, raidz2, raidz3, etc. Every disk and each redundancy group in a ZFS pool is denoted as vdev; vdevs are represented by the vdev_t structure. Leaf nodes are referred to as leaf vdevs and represent physical storage devices. Intermediate nodes are logical redundancy groups which include mirror, raidz, raidz2 and raidz3.

Leaf vdevs (that is, storage disks) are each assigned a class of storage either by the system or by administrator or SMS. Top level vdevs are assigned class of storage based on the leaf vdevs in the top level vdev. Similarly, ZFS datasets are also assigned class of storage by administrator or SMS.

Figure 10:
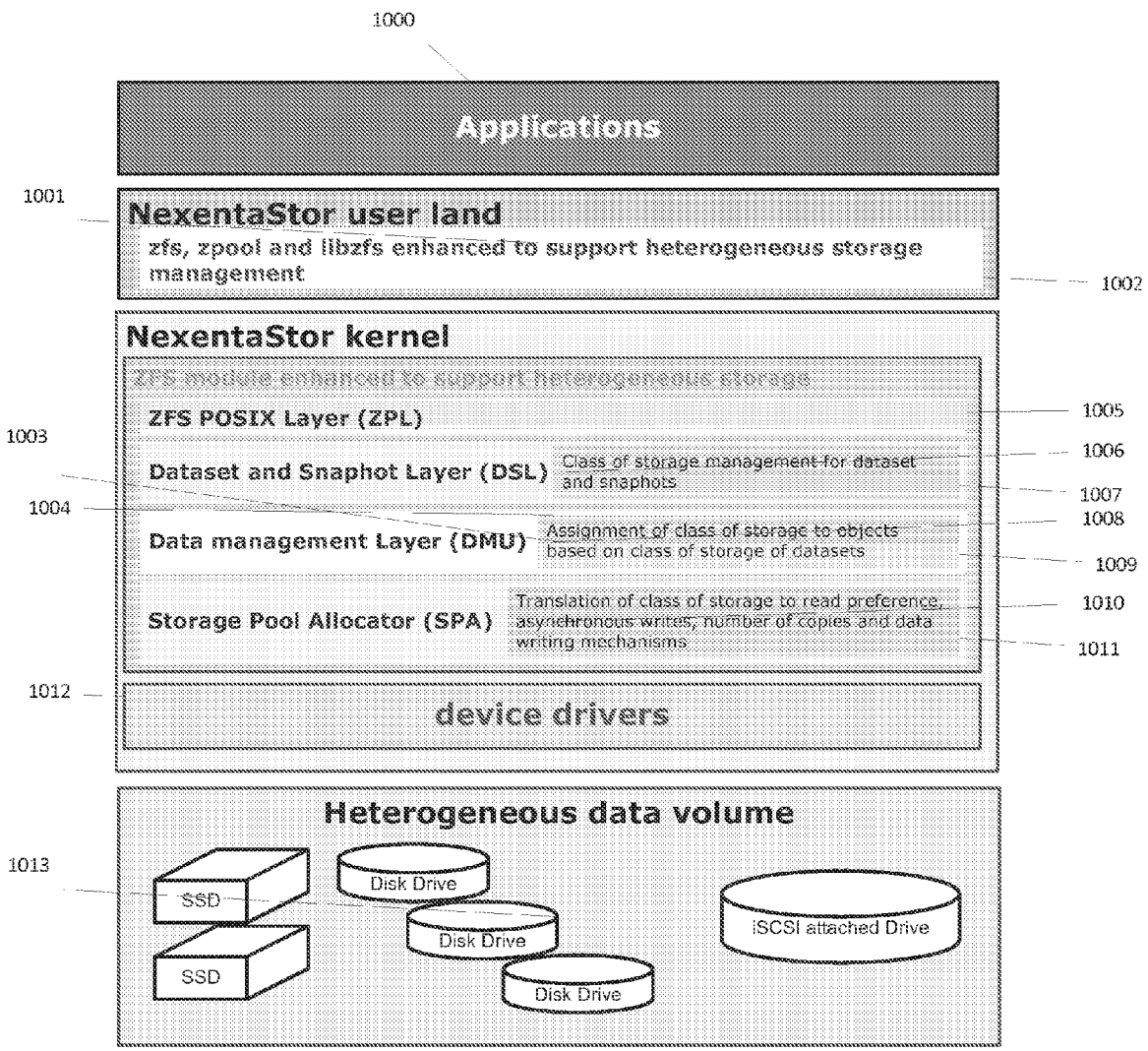
FIG. 10 illustrates a system architecture wherein ZFS is enhanced to support the present invention.

NexentaStor is a proprietary storage appliance that is based on open-source Nexenta Operating System. The latter utilizes OpenSolaris and Illumos kernels that include ZFS. FIG. 10 illustrates one embodiment wherein ZFS module within NexentaStor is enhanced to support the present invention. In this embodiment, NexentaStor appliance's kernel 1003 includes a modified ZFS kernel module 1004 that in turn provides support for heterogeneous data volume as described in the present invention.

In this embodiment, ZPL 1005 is unmodified. DSL 1006 is modified to assign, reassign, clear, and propagate via inheritance classes of storage for ZFS datasets and snapshots. DMU layer 1008 handles all data and metadata objects as far as class of storage related processing is concerned. The DMU object types are enumerated in the ZFS on-disk format specification and include DMU_OT_OBJECT_DIRECTORY, DMU_OT_PLAIN_FILE, DMU_OT_DIRECTORY_CONTENTS, DMU_OT_ACL and many other objects.

Further in this embodiment, SPA layer 1011 is enhanced to support read preference logic, asynchronous writes and per class of storage data access mechanisms. ZFS module interfaces with the device driver layer 1012 which in turn interfaces with the heterogeneous storage array 1013 that contains disks of different classes of storage. NexentaStor userland 1001 includes a modified zfs management commands and libraries 1002 to manage heterogeneous data volume.

In the embodiment, when DSL 1006 initiates an I/O request by creating a ZIO, it specifies the class of storage for ZIO in the zio_t structure. DMU 1008 then assigns the class of storage property to each of the objects managed by the ZIO. SPA 1010 takes this class of storage into consideration while selecting the vdevs for I/O. Write and read algorithms illustrated in FIG. 7 and FIG. 8 are implemented in the SPA layer and operate on ZIO passed down by the DMU.

SPA implements write and read routing for ZIO with associated class of storage. For a ZIO to be written, a metaslab has to be selected. The metaslab selection algorithm considers the associated class of storage of the ZIO. Metaslab inherits the class of storage of the vdev that contains the metaslab. Class of storage of ZIO is matched with the metaslab's class of storage and selected only if there is a match. Similarly for read routing, SPA implements the read preference logic for the data that is stored in multiple copies. Storage administrator or SMS can override the system and designate any given vdev to be the preferred vdev for reading.

Data with multiple copies is handled by the mirror logic in ZFS. Default unmodified ZFS logic selects a copy in a round-robin fashion. This embodiment (FIG. 10) selects vdevs for reading based on the read preference value that is either computed by the system at runtime or set by administrator or SMS; other copies are processed only if the selected copy fails ZFS data integrity check.

The present invention is not intended to be limited to the embodiments shown, but is to be accorded the widest scope consistent with the principles and features described herein. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for reading a data segment of a logical block of data from a heterogeneous data volume, the method comprising:

receiving a read operation to read the data segment from the heterogeneous data volume, wherein:
  a first redundant copy of the data segment is stored in a first class of storage and
  a second redundant copy of the data segment is stored in a second class of storage;
in response to receiving the read operation:
  determining a first read preference value for the first redundant copy of the data segment based at least in part on a first number of input/output operations currently pending at the first class of storage and a first statically-defined latency associated with the first class of storage;
  determining a second read preference value for the second redundant copy of the data segment based at least in part on a second number of input/output operations currently pending at the second class of storage and a second statically-defined latency associated with the second class of storage;
  selecting one of the first and the second redundant copies of the data segment based on the first and the second read preference values; and
  retrieving the selected redundant copy of the data segment.

2. The method of claim 1, wherein selecting the one of the first and the second redundant copies of the data segment comprises:
  selecting the first redundant copy of the data segment if the first read preference value is greater than or equal to the second read preference value; and
  selecting the second redundant copy of the data segment if the first read preference value is less than the second read preference value.

3. The method of claim 1, wherein the first read preference value is selected based on a dynamically-computed operational parameter associated with the first class of storage.

4. The method of claim 1, wherein retrieving the selected redundant copy comprises:
  determining an access mechanism specific to the selected redundant copy of the data segment; and
  retrieving the selected redundant copy of the data segment using the access mechanism.

5. The method of claim 4, wherein the access mechanism is determined based on whether the selected redundant copy is stored in the first class of storage or the second class of storage.

6. A system for reading a data segment of a logical block of data from a heterogeneous data volume, the system comprising:
  a first class of storage configured to store a first redundant copy of the data segment;
  a second class of storage configured to store a second redundant copy of the data segment; and
  control circuitry configured to:
    receive a read operation to read the data segment from the heterogeneous data volume;
    determine, in response to receiving the read operation, a first read preference value for the first redundant copy of the data segment based at least in part on a first number of input/output operations currently pending at the first class of storage and a first statically-defined latency associated with the first class of storage;
    determine, in response to receiving the read operation, a second read preference value for the second redundant copy of the data segment based at least in part on a second number of input/output operations currently pending at the second class of storage and a second statically-defined latency associated with the second class of storage;
    select one of the first and the second redundant copies of the data segment based on the first and the second read preference values; and
    retrieve the selected redundant copy of the data segment.

7. The system of claim 6, wherein the control circuitry selects the one of the first and the second redundant copies of the data segment by being further configured to:
  select the first redundant copy of the data segment if the first read preference value is greater than or equal to the second read preference value; and
  select the second redundant copy of the data segment if the first read preference value is less than the second read preference value.

8. The system of claim 6, wherein the control circuitry is further configured to select the first read preference value based on a dynamically-computed operational parameter associated with the first class of storage.

9. The system of claim 6, wherein the control circuitry retrieves the selected redundant copy by being further configured to:
  determine an access mechanism specific to the selected redundant copy of the data segment; and
  retrieve the selected redundant copy of the data segment using the access mechanism.

10. The system of claim 9, wherein the control circuitry is further configured to determine the access mechanism based on whether the selected redundant copy is stored in the first class of storage or the second class of storage.

* * * * *